(12) United States Patent
Nobil (10) Patent No.: US 10,443,726 B2
(45) Date of Patent: Oct. 15, 2019

(54) SUSPENSION SEAL

(71) Applicant: John B. Nobil, La Jolla, CA (US)

(72) Inventor: John B. Nobil, La Jolla, CA (US)

( * ) Notice: Subject to any disclaimer, the term of this patent is extended or adjusted under 35 U.S.C. 154(b) by 515 days.

(21) Appl. No.: 15/018,699

(22) Filed: Feb. 8, 2016

(65) Prior Publication Data

US 2016/0230834 A1     Aug. 11, 2016

Related U.S. Application Data

(60) Provisional application No. 62/113,485, filed on Feb. 8, 2015.

(51) Int. Cl.
*F16F 9/36* (2006.01)
*F16J 9/14* (2006.01)

(52) U.S. Cl.
CPC ............... *F16J 9/14* (2013.01); *F16F 9/362* (2013.01); *F16F 2230/0023* (2013.01)

(58) Field of Classification Search
CPC ...... F16J 9/14; F16F 9/362; F16F 2230/0023; F16L 19/00
USPC .................................................. 277/434, 435
See application file for complete search history.

(56) References Cited

U.S. PATENT DOCUMENTS

| | | | | |
|---|---|---|---|---|
| 739,721 A | * | 9/1903 | Roberts | F16J 9/14 277/451 |
| 2,226,039 A | * | 12/1940 | Wiltse | F16L 19/00 285/222.4 |
| 2,859,061 A | * | 11/1958 | Reid | F16J 15/328 156/213 |
| 3,227,497 A | * | 1/1966 | Heckethorn | F16F 9/362 277/568 |
| 3,870,381 A | * | 3/1975 | Overkott | F16J 9/00 384/16 |
| 3,926,332 A | * | 12/1975 | Okamoto | B65D 88/50 220/216 |
| 4,109,921 A | | 8/1978 | Urbascheck | |
| 4,529,181 A | * | 7/1985 | Wallis | B21D 24/02 267/119 |
| 4,583,722 A | * | 4/1986 | Wallis | B21D 24/02 267/119 |
| 4,987,826 A | * | 1/1991 | Deppert | F16F 9/364 188/322.17 |
| 5,314,172 A | * | 5/1994 | Wallis | F16F 9/0218 184/24 |
| 5,749,603 A | * | 5/1998 | Mann | F16L 33/03 24/20 R |
| 5,845,749 A | * | 12/1998 | Moretz | F16F 9/362 16/67 |

(Continued)

*Primary Examiner* — Eugene G Byrd
(74) *Attorney, Agent, or Firm* — Timothy W. Fitzwilliam (57) ABSTRACT

A retrofittable, or originally manufactured, shock piston and cylinder protection seal and method of retrofitting to same is disclosed. A preferred embodiment includes one to four individual wipers contacting the shock piston thereby maintaining its surface free from debris with minimal friction affecting the intended dampening properties of suspension. Different embodiments are further disclosed that allow for loosening of components by threaded members and replacement with either a collar or a foam seal that can peel away from the cylinder for removal and replacement. The originally manufactured version of the invention incorporates the seal housing to a bottom shock cylinder.

8 Claims, 11 Drawing Sheets

(56) References Cited

U.S. PATENT DOCUMENTS

| | | | | |
|---|---|---|---|---|
| 5,980,670 | A * | 11/1999 | Andre | F16L 21/005 138/109 |
| 6,003,848 | A * | 12/1999 | Cotter | F16F 9/0218 188/322.16 |
| 6,179,297 | B1 * | 1/2001 | Bauman | F16F 9/0218 277/437 |
| 6,905,124 | B2 * | 6/2005 | Zafar | F16F 9/3278 267/64.11 |
| 6,988,740 | B2 | 1/2006 | Bobrovniczky | |
| 7,172,200 | B2 * | 2/2007 | Watling | F16F 9/3242 152/53 |
| D562,737 | S | 2/2008 | Fujita | |
| 7,559,542 | B2 * | 7/2009 | Cotter | F16F 9/0218 188/322.17 |
| 8,336,890 | B2 * | 12/2012 | Verwoerd | F16J 15/162 277/643 |
| 8,672,106 | B2 | 3/2014 | Laird et al. | |
| 8,776,351 | B2 * | 7/2014 | Bird | F16L 21/022 277/603 |
| 9,517,804 | B2 * | 12/2016 | Perry | H04B 5/0062 |
| 2006/0219506 | A1 * | 10/2006 | Zdeb | F16F 7/09 188/322.16 |
| 2007/0290402 | A1 * | 12/2007 | Edwards | B29C 37/0075 264/259 |
| 2009/0205913 | A1 * | 8/2009 | Hart | F16F 9/3285 188/267.2 |
| 2010/0230875 | A1 * | 9/2010 | Vandine | F16F 9/0218 267/114 |
| 2013/0146408 | A1 * | 6/2013 | Lee | F16F 9/36 188/322.17 |
| 2014/0333033 | A1 * | 11/2014 | Kiecksee | F16J 15/56 277/550 |

* cited by examiner

SUSPENSION SEAL

PRIORITY CLAIM

This patent application claims benefit of the priority date of U.S. Prov. Pat. App. Ser. No. 62/113,485 filed on Feb. 6, 2015, entitled "Shock Seal," accordingly, the entire contents of this patent application is hereby expressly incorporated by reference.

BACKGROUND OF THE INVENTION

1. Field of the Invention

The present invention pertains generally to annular seals configured around rotating or translating shafts. More particularly, the invention relates to a shock seal apparatus coupled to a front fork suspension, improving the longevity of the shock absorption device, particularly in off road environments.

2. Description of the Prior Art

Annular seals, gaskets, rubber boots and bearings configured around a piston/shaft member of some sort are numerous and have been known in the mechanical arts for some time. One particular area of innovation involves the evolution of mountain bikes from makers such as CANNONDALE® and SPECIALIZED®. Included in this was a move from a rigid frame and fork (FIG. 5A) to full suspensions. One issue particular to the problem is the rapid degradation of the interface between a shock piston and cylinder in mountain terrain environments due to present of dirt and fine particulate debris.

Due to the harsh conditions, cyclists are confronted with dirt and dust ridden shock absorbers increasing friction between dampening components. This has led to the more serious riders either replacing used shocks very rapidly or needing special equipment to service the front fork suspension. Furthermore, there is a risk associated with a typical cyclist making a mistake in taking apart multicomponent suspensions. Even if the proper tools are made available, the job is currently very time consuming and can take upwards of three hours to complete.

Some early examples providing improved seal maintenance and protection include the ROCK SHOX® and the SRAM® fork wiper. However, additional improvements in performance, reliability as well as expense of time and money to replace and maintain. In light of the issues presented herein, the invention seeks to provide a shock seal retrofitable to existing shocks but also available to original equipment manufacturers (OEMs). It is further an object of the present invention to provide a suspension seal that can easily and cost effectively be removed, cleaned and replaced by a cyclist with little or no tool and mechanical experience. Yet further, it is an object of the present invention to provide annular translational support, lubrication and wiping to a suspension shaft. Still further it is an object of the present invention, to provide a system for sealing a shock absorber that has certain key components that peel off for replacement and other components that are not removed but cleaned without complete removal. Furthermore, it is an additional object reduce static friction of current seal designs.

BRIEF SUMMARY OF THE INVENTION

The present invention specifically addresses and alleviates the above mentioned deficiencies, more specifically, the present invention, in a first aspect, is a suspension seal configured to a shock piston and cylinder arrangement comprising: a seal housing configured concentrically to the shock piston and cylinder arrangement; and a first wiper seal configured circumferentially about an inside edge of the seal housing, the first wiper seal having a leading edge that thinly contacts a surface of a piston of said shock piston and cylinder arrangement preventing dirt and debris from fouling the shock piston and cylinder arrangement.

The invention herein is additionally characterized as comprising: a lower foam seal configured about an inside wall of the seal housing, a lubricant added to the lower foam seal providing lubrication and capturing dirt; and a top seal cover configured atop the seal housing, the top seal cover having a second wiper seal configured thereto circumferentially about an edge of seal housing, the second wiper seal having a leading edge that thinly contacts the surface of the piston preventing dirt and debris from fouling said shock piston and cylinder arrangement.

The invention in this aspect additionally comprises an upper flexible seal about an inside of the top seal cover. And, the invention has a retention spring around an outside of the top seal cover, wherein the top seal cover comprises notches configurable to protrusions configured to a wrench device.

The suspension seal herein further includes the lower foam seal further comprising a diagonal tear extending therethrough providing peel away functionality to the lower foam seal. The suspension seal also includes a dual threaded seal mount having a first set of male threads to mate with the seal housing, the seal housing configured with female threads about an inside thereof. Set further the invention in this aspect includes: a lower foam seal configured about an inside wall of the seal housing; a lubricant added to the lower foam seal providing lubrication and capturing dirt; and a top seal cover configured atop the dual threaded seal mount, the top seal cover having a second wiper seal configured thereto circumferentially about and edge of seal housing, the second wiper seal having a leading edge that thinly contacts the surface of the piston preventing dirt and debris from fouling said shock piston and cylinder arrangement, wherein the dual threaded seal mount has a third wiper configured about an inside edge thereof.

Additionally in certain aspect the invention includes to the seal housing: a pair of semicircular halves; and a pair of flanges configured to the pair of semicircular halves joining the seal housing, the flanges configured with a pair of setscrews for a coupling of the pair of semicircular halves.

In an additional embodiment herein, the seal housing is configured inside of a cylinder of said shock piston and cylinder arrangement.

Also in yet another aspect, the seal housing is further characterized as having a first and a second semicircular halves; and the seal housing also includes a tab configured to an end of the first semicircular halve and a protrusion configured to an end of the second semicircular halve, tab fitting over the protrusion for coupling and uncoupling the first and second semicircular halves for removal of the seal housing.

While the apparatus and method has or will be described for the sake of grammatical fluidity with functional explanations, it is to be expressly understood that the claims, unless expressly formulated under 35 USC § 112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC § 112 are to be accorded full statutory equivalents under 35 USC § 112, or similar applicable law. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF PREFERRED EMBODIMENTS

Figure 1A:
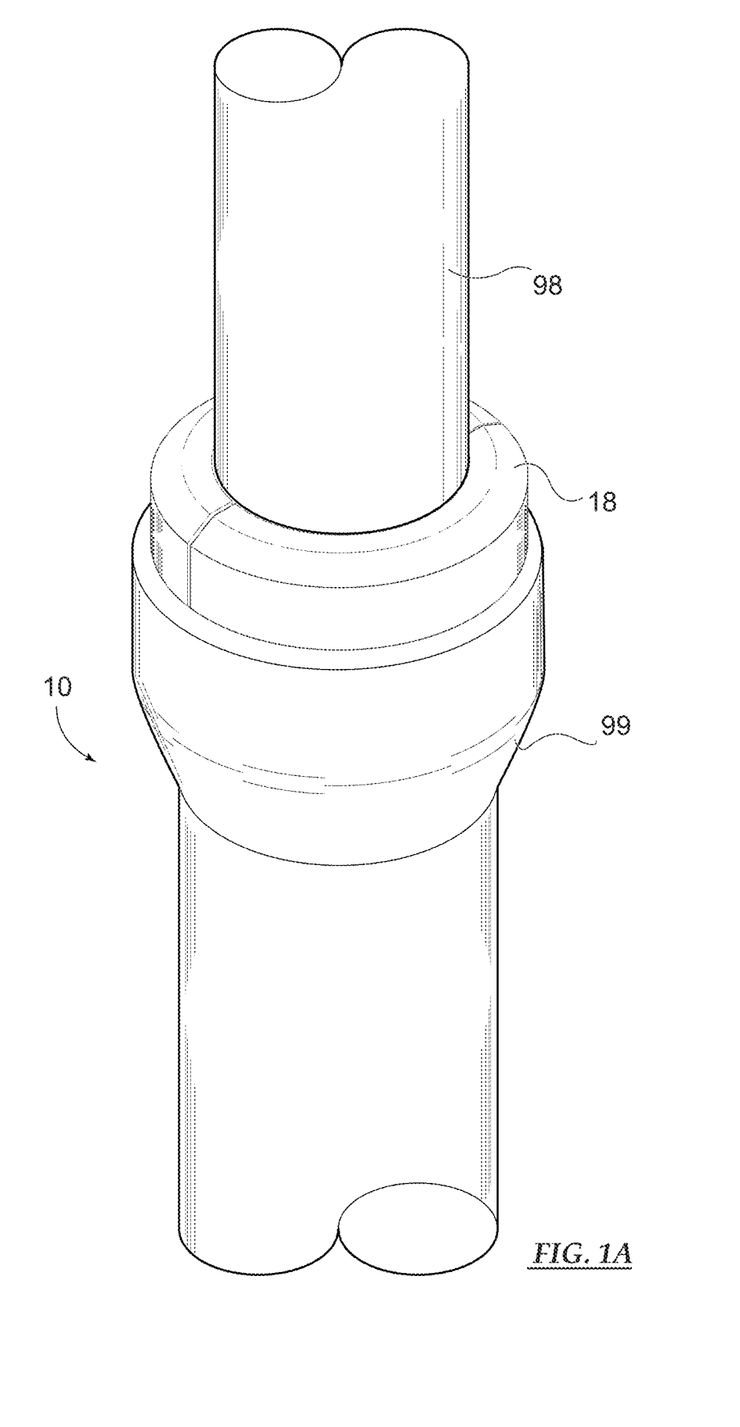
FIG. 1A is a perspective view of a first preferred suspension seal embodiment of the invention.
Figure 1B:
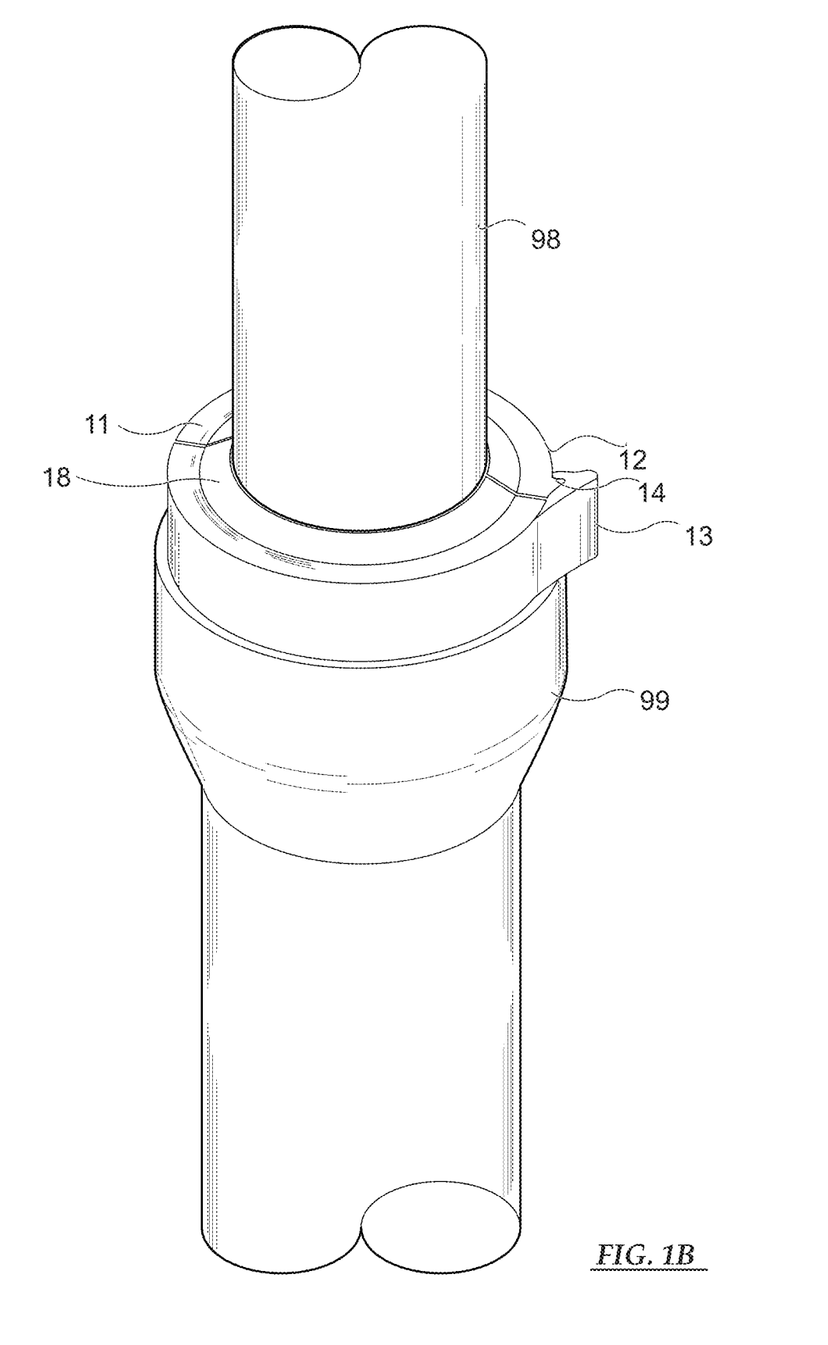
FIG. 1B is a second perspective thereof from an elevated vantage point.
Figure 1C:
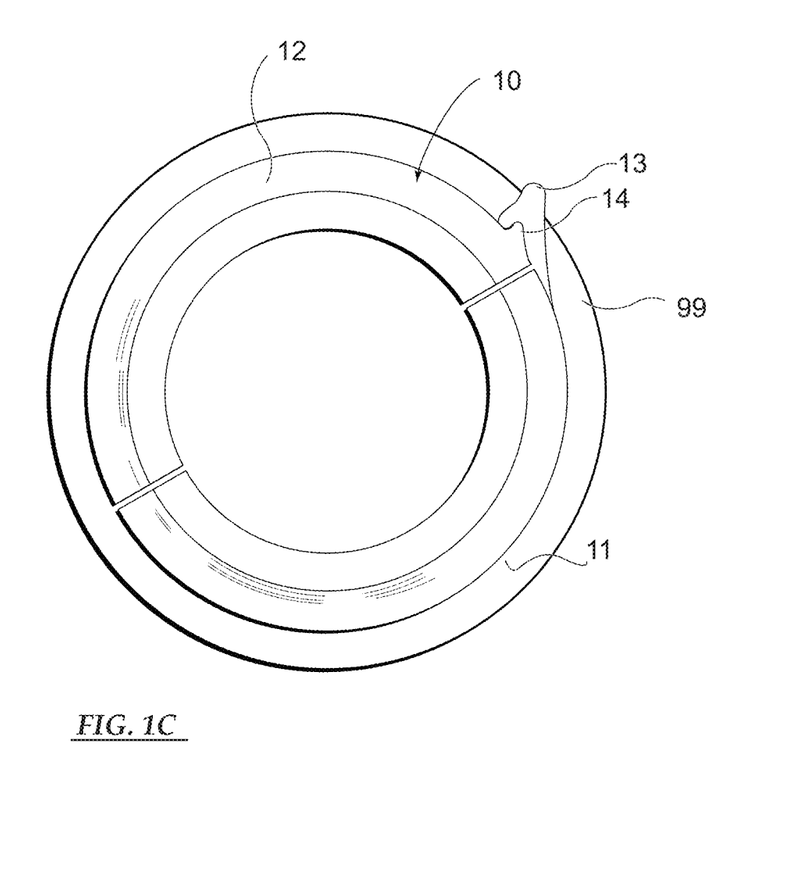
FIG. 1C is a top view of the preferred embodiment.
Figure 2A:
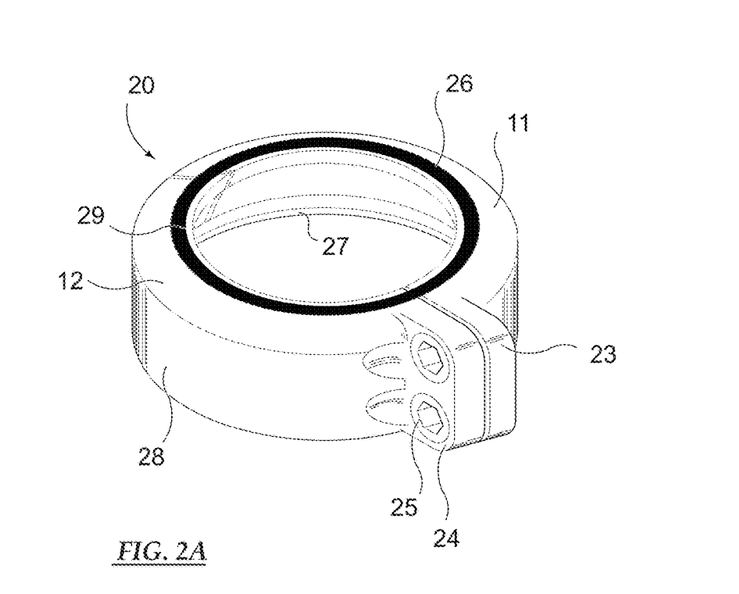
FIG. 2A is a perspective view of a second embodiment of the present invention.
Figure 2B:
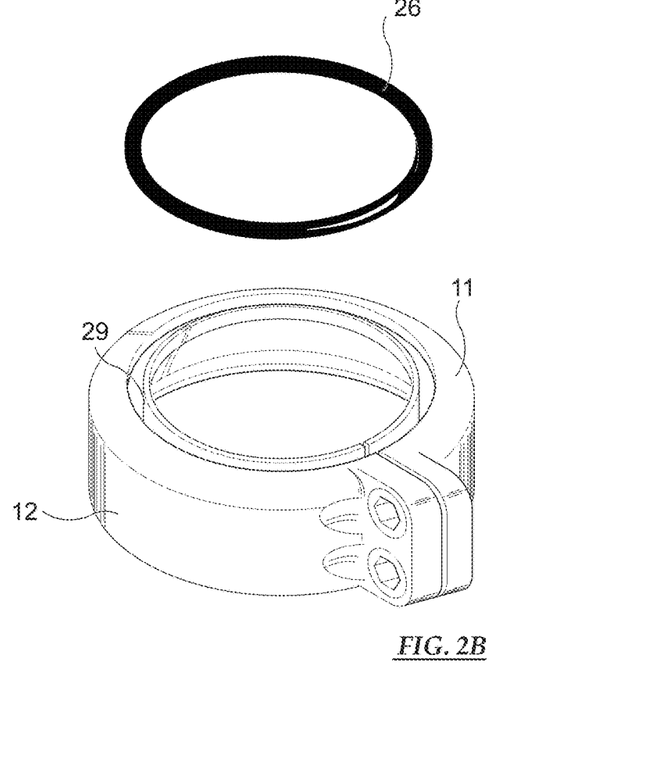
FIG. 2B is an exploded view thereof.

Initially with regard to FIG. 1A, a first preferred embodiment of a suspension seal 10 of the present invention wherein a seal housing 18 is configured to an annular seal ring 26 (FIG. 2B). As further illustrated in FIG. 1B and FIG. 1C, the seal housing 18 comprises two semicircular rings 11, 12 that are provided at an interface between shock piston 98 and cylinder 99.

Also as shown, a seal housing 18 has a first half 11 and is configured with a tab 13 at an end thereof, the tab 13 is made to fit around a protrusion 14 configured to the second half 12 of seal housing 18. Conveniently, a thumb of a user can easily remove the seal housing 18 for cleaning or replacement, without tools.

An additional variation is shown in perspective in FIG. 2A. Herein, seal housing 28 first 11 and second 12 semicircular halves have ends configured with flanges 23, 24, the flanges secured by one or two (as shown) setscrews 25. FIG. 2B more clearly illustrates wherein an annular ring 26 is a removable piece secured in a recess 29 to the seal housing 28. It is important to note that only a thin, leading edge, portion of the seal/ring 26 will contact the shock piston 98 as to minimize effects of excessive friction affecting dampening properties of the shock 98, 99. In certain aspects of the present invention, annular ring 26 is a first wiper to the piston 98. Also importantly, the present invention will apply to rear shocks, as applicable, additionally for dirt bikes and motocross.

Additionally regarding FIG. 2A, a wiper 27 having a thin leading edge may be configured about a lower portion of collar 20.

Also with regard to FIG. 2B, the annular ring 26 (wiper 26) can have varying diameters while leaving a constant collar size making it easier to stock in store and mass produce. More specifically, annular rings having 32 mm, 34 mm, 35 mm, 36 mm, and 40 mm diameter are provided.

Yet another embodiment herein combines that of first 10 (FIG. 1A) and second 20 (FIG. 2A) embodiments. As in FIG. 2A, an upper portion of the seal housing 18, 28 halves 11, 12 is fastened with a more permanent mini setscrew 25. However, a bottom portion simultaneously employs the miniature lever 13 and protrusion 14 fastener. In order to facilitate cleaning the seal housing/wiper and/or annular ring 26, the collar will no longer have to be removed from the fork 97 completely. Rather in the lower half of the seal housing, (the part that is fastened rigidly to the stock fork) the user simply unsnaps the lower fastener and slides the collar up the fork while leaving the top setscrew alone (since it will not be as snugly secured). In this configuration, the delicate top seal will not be as frequently stressed because the setscrew 25 will not have to be reset. The user can then remove/replace the foam (wiper/annular ring 26) without having to fiddle around/remove/deform the wiper itself. After the foam & lubricant is replaced the wiper slides back down the fork and the snap closure is closed quickly and easily around the stock fork wiper. Accordingly the user will not have to negotiate the retention springs 31 or tiny set screws 25 making the product much more user serviceable especially for cyclists riding in wet environments that need to do this more than once a week.

Yet still alternatively the upper portion can have the setscrew 25 and the bottom portion of the collar is configured with the lever 13 and protrusion 14.

Figure 3A:
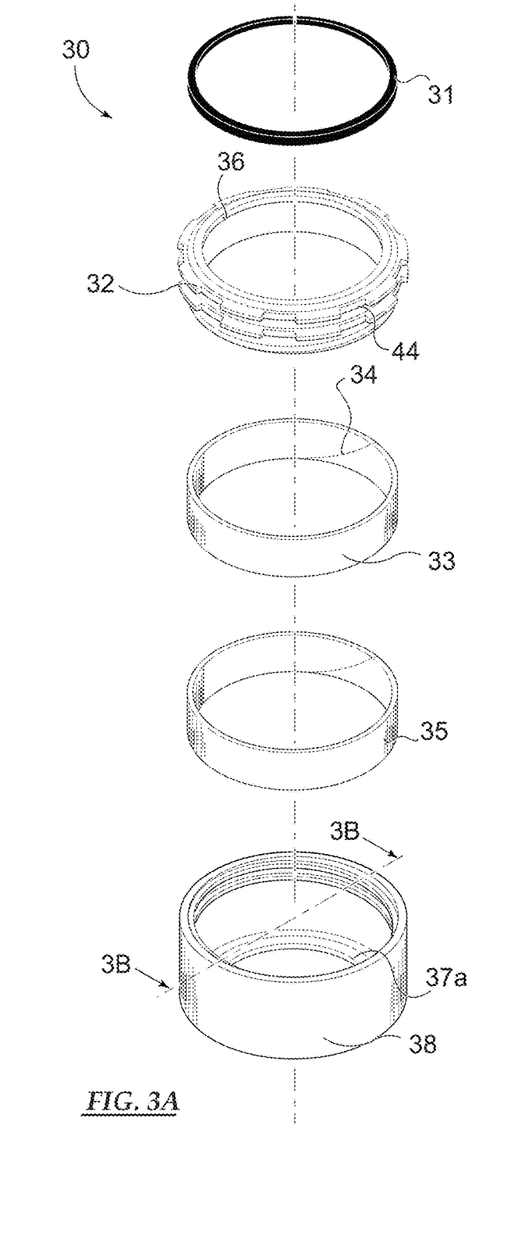
FIG. 3A is an exploded view of a third preferred embodiment of the present invention.

With regard to FIG. 3A, an exploded view of a third preferred embodiment 30 of the present invention is provided. A top seal cover 32 provides a second wiper seal 36 to the tubular shaft 98 (seal housing 38 having the first 37a) component translationally configured to a cylinder 99 wherein the interface is desired to be kept lubricated and clean. The top seal cover 32 may be made as a single piece; or alternatively, the top seal mount 32 has soft pliable material for the wiper 36 coupled with harder material providing structural support. A retention spring 31 further holds components in place. Upper 33 and lower 35 foam seals have a tear 34 away (peel) design so that they are easily removed for disposal or cleaning. More specifically, the foam seals 33, 35 have a diagonal cut 34 therethrough. Seal housing 38 provides the main lower structural support to the device 30; and wiper seal 37a provides a lower/first wiper seal.

The present embodiment 30 compares to the first two 10, 20 embodiments in that the annular ring 26 is the first wiper seal 36.

Figure 3B:
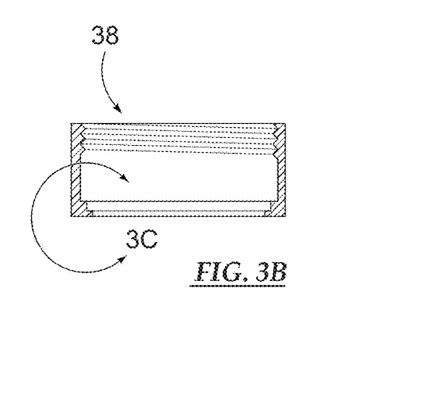
FIG. 3B is a cross-sectional view of a seal housing taken along line 3B-3B in FIG. 3A.
Figure 3C:
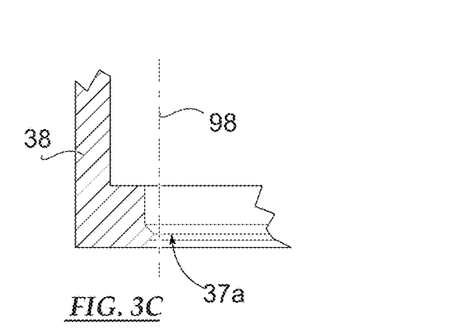
FIG. 3C is an enlarged view of a preferred seal housing wiper embodiment taken about line 3C in FIG. 3B.
Figure 3D:
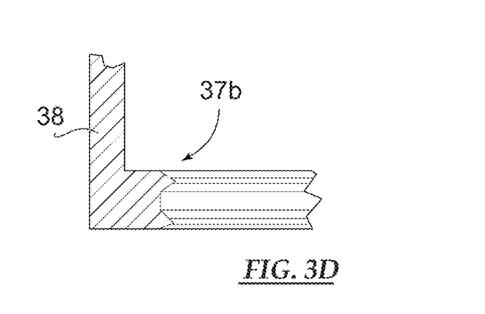
FIG. 3D is an alternative enlarged view of a double wiper embodiment.

FIG. 3B provides a cross-sectional view of a seal housing taken along line 3B-3B in FIG. 3A. To further illustrate wiper 37a configurations of the present invention, FIG. 3C provides an enlarged view of a preferred seal housing wiper embodiment taken about line 3C in FIG. 3B. FIG. 3D accordingly shows a double wiper 37b configuration to a bottom of the seal housing 38. Like the top seal cover 32 wiper 36, the lower wipers 37a, 37b could be configured with softer material inserted/attached to the seal housing 38.

Figure 4:
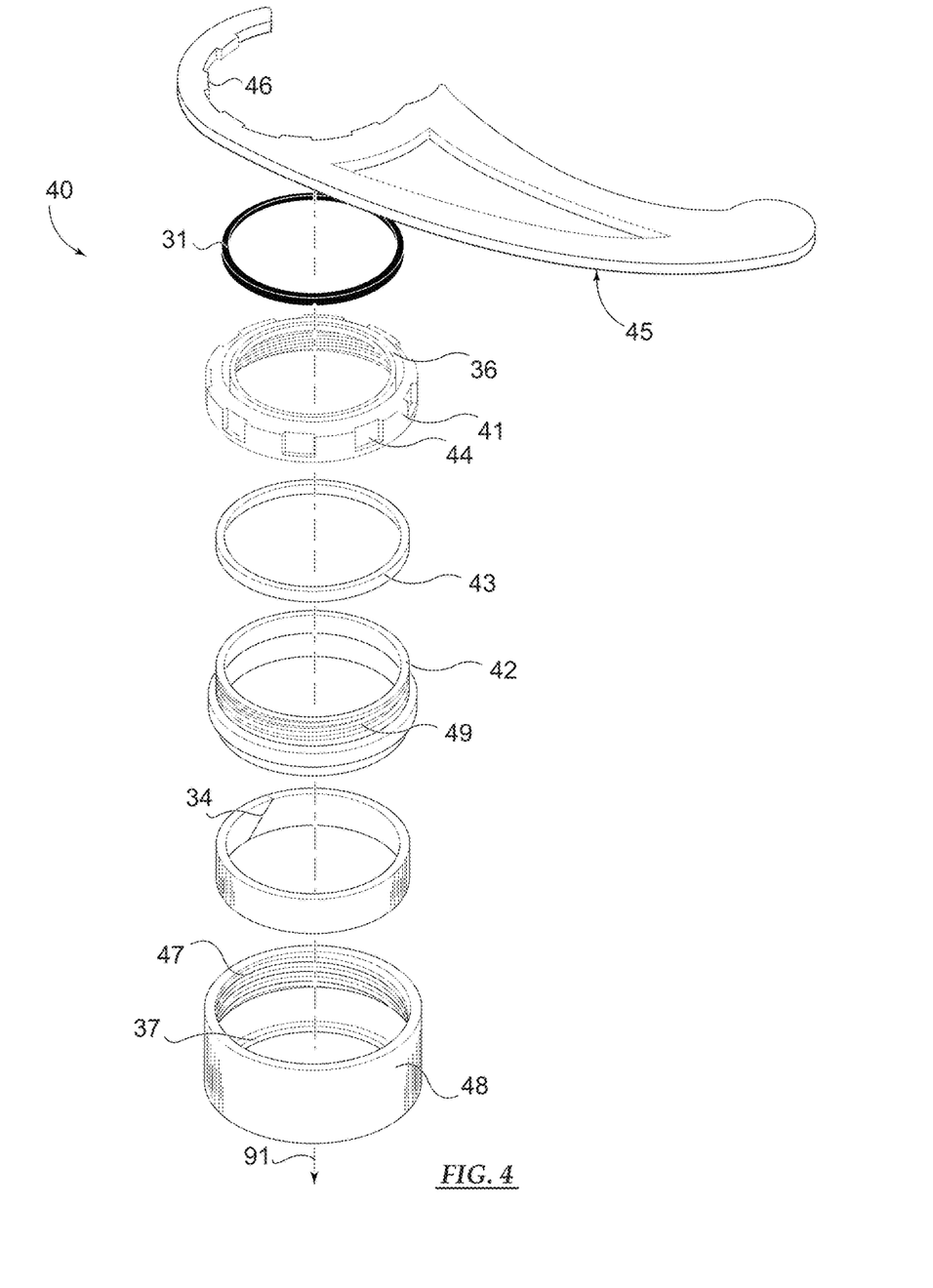
FIG. 4 is an exploded view of a forth suspension seal embodiment providing additional wiper capabilities.

FIG. 4 provides an exploded view of a slightly different version 40 as compared to the FIG. 3A embodiment 30. Herein, a special wrench 45 is provided that has protrusions 46 that couple to top seal cover 41 notches 44 allowing loosening of a dual threaded 42 seal mount. Dual threaded seal mount 42 has male threads around an outside thereof to couple to the seal housing 48 female threads 47 and top cover 41 female threads. Notably, in the FIG. 3A embodiment 30, the top cover 32 has the female threads since there is no duel threaded seal mount 42. As before however, the lower foam seal 35 can be peeled 34 away while other components can be loosened and slid vertically to provide cleaning and maintenance thereto. Also as in other embodiments, components 31, 35, 37, 41, 42, 43, are configured concentrically, about axis 91 also corresponding to shock piston 98 and cylinder 99 arrangement. Additionally in this embodiment 40, multiple wipers 36, 37, 49, referred to herein as upper/second 36, lower/first 37 and center/third 49 wipers, are provided to control passing of dirt and therefore prevent frictional surface therefrom over time.

Alternatively in this embodiment 40, upper foam seal 33 is replaced with a rubber seal 43. Both 33, 43 are flexible seals. Also, seal housing 48 has female threads 47 about an inside thereof; and the seal housing 48 is a custom molded semi-permanent insert.

Figure 5A:
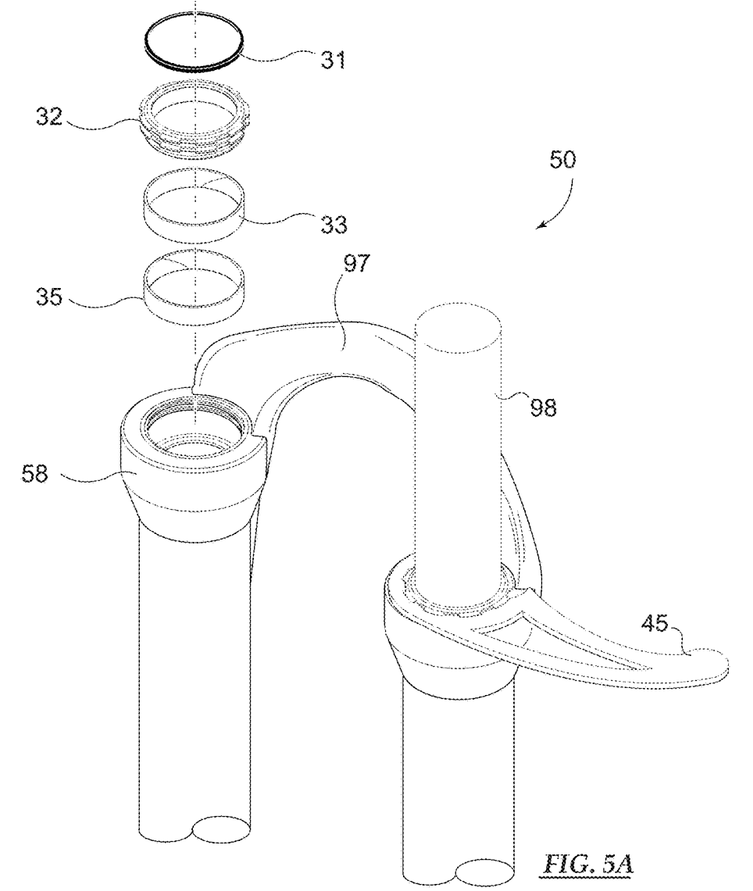
FIG. 5A is a perspective view with exploded select components of a fifth preferred embodiment where the seal housing is originally configured to a fork type shock absorber.
Figure 5B:
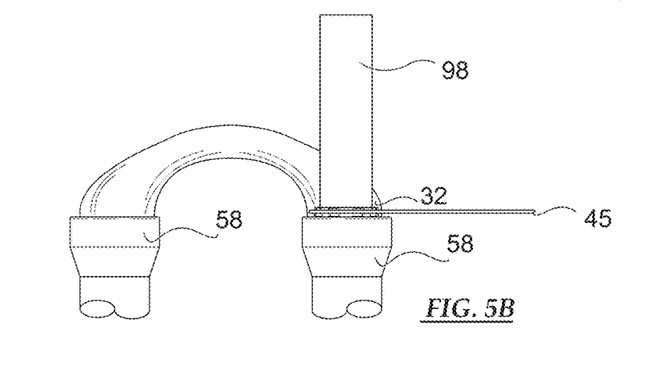
FIG. 5B is a partial front view thereof.
Figure 5C:
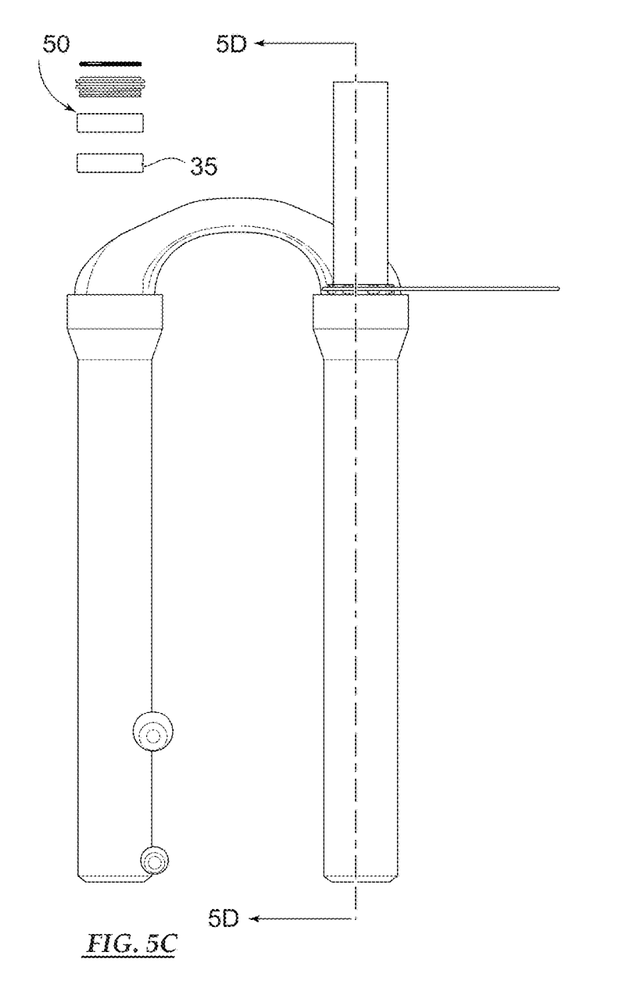
FIG. 5C is a full front view thereof.

FIG. 5A, FIG. 5B and FIG. 5C show an additional embodiment 50 for an original equipment manufacturer (OEM) utilization rather than retrofitable 10, 20, 30, 40 to existing designs. Components 31, 32, 33, 35 in this scenario are simplified and the lower seal housing 58 is configured to the shock cylinder 99. Additional front views are provided in FIG. 5B and FIG. 5C. The optimum design according to the invention will minimize risk of making a mistake in disassembling and reassembling the shock seal and take less time to complete as compared to earlier designs.

Figure 5D:
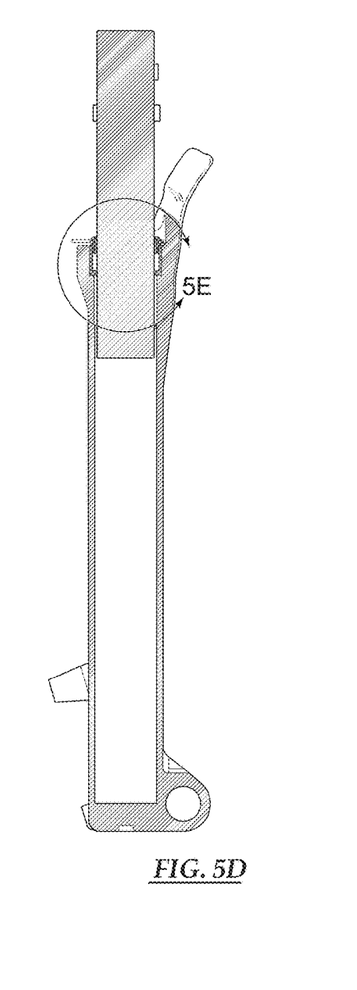
FIG. 5D is a cross-sectional view taken along line 5D-5D in FIG. 5C.
Figure 5E:
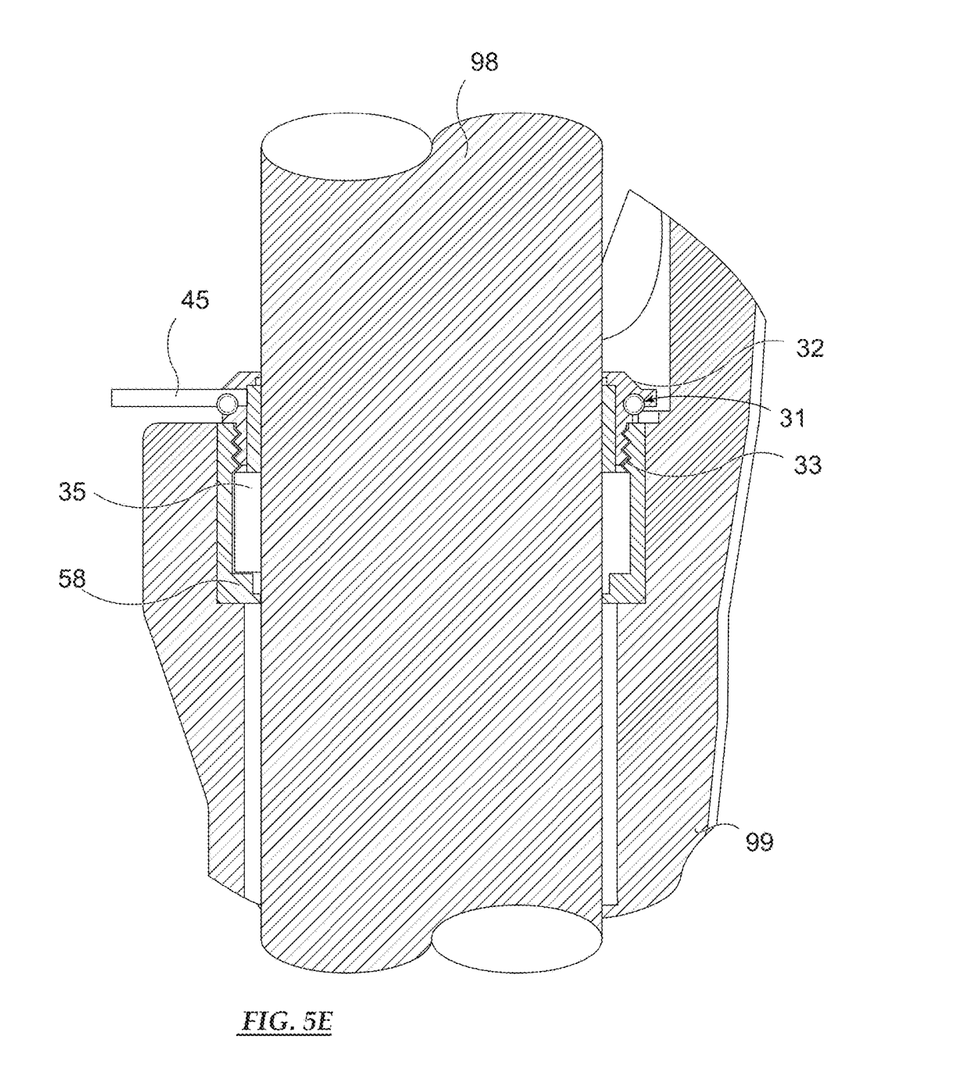
FIG. 5E is an enlarged view taken about line 5E in FIG. 5D.

FIG. 5D provides a cross-sectional view taken along line 5D-5D in FIG. 5C; and FIG. 5E is an enlarged view taken about line 5E in FIG. 5D. FIG. 5E illustrates components assembled but hidden inside shock cylinder 99. Initially, top seal cover 32 can be screwed and unscrewed to seal housing 58 having the female threads 47. Retention spring 31 couples around an outside of the top seal cover 32 to hold components together. Retention spring 31 further provides light constant pressure on top wiper 36 to allow flexing and lighter friction. The wiper 36 (FIG. 3A) should also provide initial protection from debris and moisture, using for example, high density, closed cell polyurethane material. Conversely material wise, lower foam seal 35 is the main source of lubrication and is made from softer, lower density lipophilic polyurethane material.

Figure 6A:
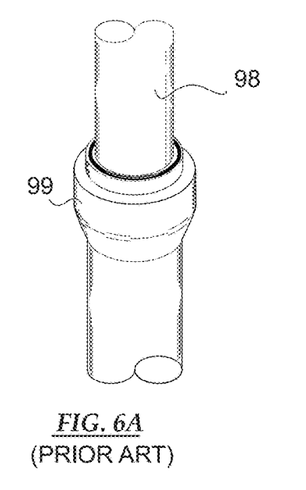
FIG. 6A is a first perspective view of a deficient prior art shock piston and cylinder suspension device.

Now regarding FIG. 6A, a first perspective view of a deficient prior art shock piston and cylinder suspension device is illustrated. FIG. 6A is followed by FIG. 6B, FIG. 6C, FIG. 6D and FIG. 6E showing method steps in retrofitting the existing suspension device 98, 99.

Specifically with regard to FIG. 6A, a typical shock absorber device 98, 99 comprises a shaft 98 translationally configured to a cylinder 99 as shown. In a preferred embodiment, the shaft 98 is on half of a front fork 97 (FIG. 5A) on a mountain bike or a motocross dirt bike. At the interface of the shaft and cylinder, a seal spring 61 (O-ring) is provided. The method disclosed herein will provide an improvement to the interface that prevents dirt and debris deposited on the shaft from entering the cylinder 99 and adversely affecting shock absorption properties of the suspension fork.

Figures 6B, 6D, 6E:
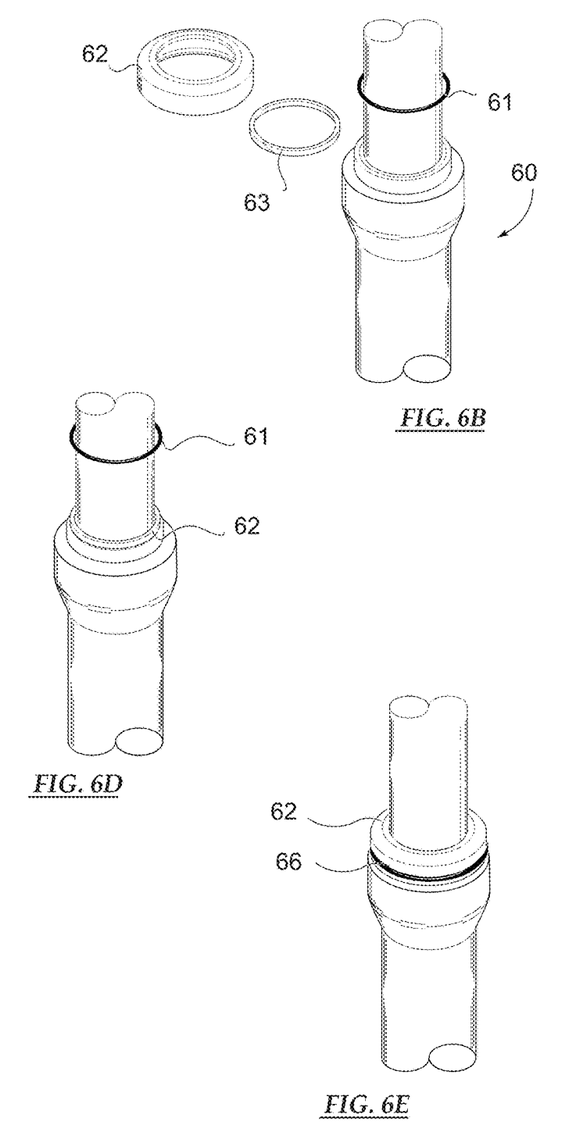
FIG. 6B, FIG. 6C, FIG. 6D and FIG. 6E show method steps in retrofitting the existing suspension device.
Figure 6C:
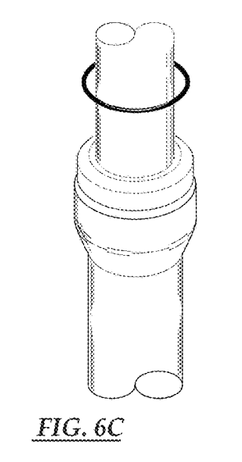

As shown in FIG. 6B, a retrofit method according to the present invention, comprises the steps of initially lifting the seal spring 61 off its seat. Next (FIG. 6B), a lubricated foam collar 63 is fitted around a shaft and cylinder interface. And subsequently, a wiper with flexible squeegee 62 is configured over the foam collar and the seal spring is replaced with a retention spring 66 according to FIG. 6D and FIG. 6E.

Figure 7:
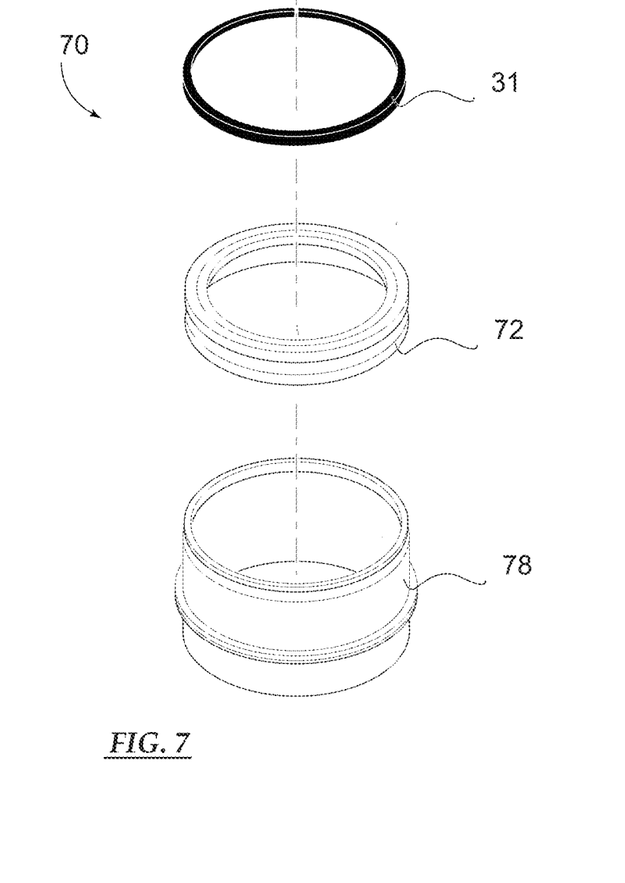
FIG. 7 illustrates yet an additional embodiment.

FIG. 7 illustrates yet another embodiment 70 wherein the lower collar 78 has separate pieces 76, 78; hence the middle piece 76 can have varying sizes, if needed.

While the particular Suspension Seal as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A suspension seal configured to a shock piston and cylinder arrangement comprising: a seal housing configured concentrically to the shock piston and cylinder arrangement; and a first wiper seal configured circumferentially about an inside edge of the seal housing, wherein the first wiper seal is integral to the seal housing together forming a singular component, the first wiper seal having a leading edge that thinly contacts a surface of a piston of said shock piston and cylinder arrangement preventing dirt and debris from fouling the shock piston and cylinder arrangement.

2. The suspension seal configured to the shock piston and cylinder arrangement of claim 1 further comprising:
a lower foam seal configured about an inside wall of the seal housing,
a lubricant added to the lower foam seal providing lubrication and capturing dirt; and
a top seal cover configured atop the seal housing, the top seal cover having a second wiper seal configured thereto circumferentially about an edge of seal housing, the second wiper seal having a leading edge that thinly contacts the surface of the piston preventing dirt and debris from fouling said shock piston and cylinder arrangement.

3. The suspension seal configured to the shock piston and cylinder arrangement of claim 2 further comprising:
an upper flexible seal about an inside of the top seal cover; and
a retention spring around an outside of the top seal cover, wherein the top seal cover comprises notches configurable to protrusions configured to a wrench device.

4. The suspension seal configured to the shock piston and cylinder arrangement of claim 2, the lower foam seal further comprising a diagonal tear extending therethrough providing peel away functionality to the lower foam seal.

5. The suspension seal configured to the shock piston and cylinder arrangement of claim 1 further comprising:

a dual threaded seal mount having a first set of male threads to mate with the seal housing, the seal housing configured with female threads about an inside thereof;

a lower foam seal configured about an inside wall of the seal housing;

a lubricant added to the lower foam seal providing lubrication and capturing dirt; and a top seal cover configured atop the dual threaded seal mount, the top seal cover having a second wiper seal configured thereto circumferentially about and edge of seal housing, the second wiper seal having a leading edge that thinly contacts the surface of the piston preventing dirt and debris from fouling said shock piston and cylinder arrangement, wherein the dual threaded seal mount has a third wiper configured about an inside edge thereof.

6. The suspension seal configured to the shock piston and cylinder arrangement of claim 1, the seal housing further comprising:

a pair of semicircular halves; and a pair of flanges configured to the pair of semicircular halves joining the seal housing, the flanges configured with a pair of setscrews for a coupling of the pair of semicircular halves.

7. The suspension seal configured to the shock piston and cylinder arrangement of claim 1, wherein the seal housing is configured inside of a cylinder of said shock piston and cylinder arrangement.

8. The suspension seal configured to the shock piston and cylinder arrangement of claim 1, the seal housing further comprising:

a first and a second semicircular halves; and tab configured to an end of the first semicircular halve and a protrusion configured to an end of the second semicircular halve, tab fitting over the protrusion for coupling and uncoupling the first and second semicircular halves for removal of the seal housing.

* * * * *